(12) United States Patent
Xia (10) Patent No.: US 11,548,358 B2
(45) Date of Patent: Jan. 10, 2023

(54) TRUCK BOX COVER DEVICE EXTENDED AND RETRACTED IN TRANSMISSION MANNER

(71) Applicant: Foshan Bestwyll Auto Accessories Co., Ltd, Foshan (CN)

(72) Inventor: Yong Xia, Foshan (CN)

(73) Assignee: Foshan Bestwyll Auto Accessories Co., Ltd

( * ) Notice: Subject to any disclaimer, the term of this patent is extended or adjusted under 35 U.S.C. 154(b) by 385 days.

(21) Appl. No.: 15/931,611

(22) Filed: May 14, 2020

(65) Prior Publication Data

US 2020/0269666 A1 Aug. 27, 2020

(30) Foreign Application Priority Data

Apr. 27, 2020 (CN) .......................... 202020662445.7

(51) Int. Cl.
| | |
|---|---|
| *B60J 7/14* | (2006.01) |
| *B60J 7/04* | (2006.01) |
| *B60J 7/06* | (2006.01) |
| *E05F 15/662* | (2015.01) |

(52) U.S. Cl.
CPC ............... *B60J 7/141* (2013.01); *B60J 7/041* (2013.01); *B60J 7/067* (2013.01); *B60J 7/068* (2013.01); *E05F 15/662* (2015.01); *E05Y 2201/216* (2013.01); *E05Y 2900/516* (2013.01)

(58) Field of Classification Search
CPC ..... B60J 7/04; B60J 7/041; B60J 7/057; B60J 7/067; B60J 7/068; B60J 7/085; B60J 7/141; B60J 7/1607; B60P 7/02

USPC ...... 296/98, 100.01, 100.02, 100.03, 100.09, 296/100.1

See application file for complete search history.

(56) References Cited

U.S. PATENT DOCUMENTS

| | | | | |
|---|---|---|---|---|
| 3,667,802 A | * | 6/1972 | Love | B60J 7/068 296/100.16 |
| 4,786,099 A | * | 11/1988 | Mount | B60J 7/068 296/100.09 |
| 5,251,950 A | * | 10/1993 | Bernardo | B60J 7/041 296/100.09 |
| 2005/0035623 A1 | * | 2/2005 | Martinson | B60J 7/062 296/100.13 |
| 2016/0031305 A1 | * | 2/2016 | Bernardo | B60J 10/277 296/100.09 |
| 2016/0236552 A1 | * | 8/2016 | Hannan | B60J 7/068 |
| 2019/0193536 A1 | * | 6/2019 | Pompili | B60J 7/141 |
| 2021/0206246 A1 | * | 7/2021 | Fowler | B60J 7/068 |

* cited by examiner

*Primary Examiner* — Jason S Daniels
(74) *Attorney, Agent, or Firm* — Rumit Ranjit Kanakia (57) ABSTRACT

A truck box cover device extended and retracted in a transmission manner includes a clutch type driving gearbox, a roller shutter shaft and roller shutter cover rail support frames. The clutch type driving gearbox is connected with the roller shutter shaft. The roller shutter shaft is stripped winding shaft and comprises a transmission end and a roller shutter cover mounting shaft. One end of the transmission end is connected with the clutch type driving gearbox and is driven by the clutch type driving gearbox to correspondingly rotate, and the other end is connected to the roller shutter cover mounting shaft. One end, away from the transmission end, of the roller shutter cover mounting shaft is fixed to the interior of a driven bearing.

9 Claims, 7 Drawing Sheets

TRUCK BOX COVER DEVICE EXTENDED AND RETRACTED IN TRANSMISSION MANNER

TECHNICAL FIELD

The present invention relates to the field of transmission type extension and retraction technologies, and in particular to a truck box cover device extended and retracted in a transmission manner.

BACKGROUND

Boxes for containing and carrying articles provide enormous convenience for people's lives. Generally, the box for containing articles includes box panels and a storage cavity, wherein the box panels surround to form the storage cavity. The box for containing articles may be opened at one side face, the top, or the side face and the top in a matching manner. Recently, with the development of vehicles, a pickup truck with an opened box-shaped cargo area is more and more popular. The pickup truck is a light-duty truck having a top-opened cargo area arranged at the rear of the cab, and side panels of the cargo area are integrated with the cab. The pickup truck further is a passenger-cargo dual-purpose vehicle having a passenger compartment at the front and a cargo area at the rear. The cargo area is covered with an electric tonneau cover such that the carried cargoes are prevented from the influence of the weather and the theft; thus, the cargo area is convenient to open and close, and the appearance of the pickup truck is more attractive. In a transmission clutch structure of an electric retractable tonneau cover of the existing pickup truck on the market, a motor main shaft and a roller shutter main shaft are connected by using an internal hexagonal sleeve, and they are regular hexagonal main shafts. Transmission of power is achieved when the internal hexagonal sleeve sleeves the motor main shaft and the roller shutter main shaft so as to open and close an electric roller shutter. When the internal hexagonal sleeve moves to leave from the motor main shaft, the transmission of power of the motor main shaft is interrupted; the electric tonneau cover can be opened and closed manually at this time.

When the electric tonneau cover of the existing pickup truck cannot be regularly opened and closed due to a power system failure and the like, because the internal hexagonal sleeve has a large contact area, and the motor main shaft still affects the internal hexagonal sleeve and the roller shutter main shaft during rotation, it is difficult to move the internal hexagonal sleeve. To eliminate the abnormal state, the internal hexagonal sleeve needs to move to the motor shaft. Such operation should be completed without observation, and the internal hexagonal sleeve has the large contact area; so, it needs a professional person to complete such complex operation. Furthermore, after the electric tonneau cover is mounted on the cargo area of the pickup truck, if there is a circuit failure, or the car battery is lack of power and cannot regularly drive the motor to rotate, or the motor is damaged, the electric tonneau cover cannot be opened; so, the regular use of the cargo area is severely influenced.

Therefore, it is an emergent technical problem how to provide a convenient, rapid and high-stability box cover device extended and retracted in a transmission manner in the prior art.

SUMMARY

The present invention provides a truck box cover device extended and retracted in a transmission manner to solve the problems that there are not a transmission clutch of a retractable box cover, which has a simple structure, is convenient to use and can quickly disconnect or connect engagement transmission between a motor shaft gear and a roller shutter shaft gear, as well as a control method in the prior art.

The truck box cover device extended and retracted in a transmission manner provided by the present invention comprises a clutch type driving gearbox, a roller shutter shaft, a roller shutter cover and roller shutter cover rail support frames.

The clutch type driving gearbox is connected with the roller shutter shaft to drive the roller shutter shaft to rotate in a forward/reverse manner or stop rotating.

The roller shutter shaft is stripped winding shaft and comprises a transmission end and a roller shutter cover mounting shaft. One end of the transmission end is connected with the clutch type driving gearbox and is driven by the clutch type driving gearbox to correspondingly rotate, and the other end is connected to the roller shutter cover mounting shaft. One end, away from the transmission end, of the roller shutter cover mounting shaft is fixed to the interior of a driven bearing.

One end of the roller shutter cover is fixed to the roller shutter shaft, and the other end retracts in an extension direction of the roller shutter cover rail support frame.

The roller shutter cover rail support frames are vertically and oppositely located on two sides of the roller shutter cover mounting shaft. A rail slot is formed in an inner side wall in a retraction direction of the roller shutter cover. The two rail slots are located in two sides of the roller shutter cover in the retraction direction. Outer sides of the roller shutter cover rail support frames fit for two side walls of an opened top cover in a truck box.

Optionally, the roller shutter cover is formed by at least two hinged slats.

Optionally, a step is arranged on an inner side of the retraction end of the roller shutter cover. The height of the step is larger than the perforation height of a housing for accommodating the roller shutter shaft.

Optionally, an outer side of the retraction end is an arc step. An extending guide platform extends from the bottom of the arc step to the outside.

Optionally, roller shutter cover baffles are arranged on two sides of the roller shutter cover on the roller shutter shaft such that the roller shutter cover smoothly and stably slides.

Optionally, toothed reels are arranged on the two sides of the roller shutter cover on the roller shutter shaft and rotate while matching with toothed guide wheels of the housing.

Optionally, the clutch type driving gearbox comprises a gearbox case, a driving wheel, a transmission gear and a clutch gear. The driving gear, the transmission gear and the clutch gear are located in the gearbox case.

The driving gear and the transmission gear are oppositely arranged and forms a clutch gear set with the clutch gear. The clutch gear is located at a position vertical to a center line of a space between the driving gear and the transmission gear.

Optionally, the clutch gear sleeves and is fixed to the middle shaft. The middle shaft is located on the center line of the space between the driving gear and the transmission gear. One end of the middle shaft is inserted in a middle shaft mounting hole of a case of the clutch gear set, and the other end penetrates through a middle shaft regulating hole on the opposite side of the middle shaft mounting hole of the case. The middle shaft is connected with the case through a thread on the side of the middle shaft regulating hole. The middle shaft may move close to or away from the driving gear and the transmission gear by screwing and regulating the middle shaft from the outer side of the middle shaft regulating hole.

Optionally, side panels surround to form a gear accommodation cavity in the gearbox case. A gearbox top cover is fixed to the top of the gear accommodation cavity with the cooperation of bolts and nuts.

Optionally, the driving gear, the transmission gear and the clutch gear are sector gears, and their sector gear surfaces are opposite. The gears are engaged with each other when the clutch gear is close to the driving gear and the transmission gear; the gears are not engaged with each other when the clutch gear is away from the driving gear and the transmission gear.

Optionally, a locating stop sheet is arranged between the clutch gear and the case on the middle shaft. The diameter of the locating stop sheet is larger than that of the middle shaft regulating hole.

The truck box cover device extended and retracted in a transmission manner of the present invention has a simple structure, low production costs, stable performances, and improved market competitiveness. When the truck box cover device extended and retracted in a transmission manner is utilized as an electric roller shutter on a truck box, connection or disconnection of power transmission between the transmission shaft gear and the roller shutter shaft gear can be achieved by rotating the middle shaft during accident. The operation is convenient and rapid, and the working efficiency is high.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments in the present invention, and a person of ordinary skill in the art may still derive other drawings from these accompanying drawings without creative efforts.

DESCRIPTION OF THE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
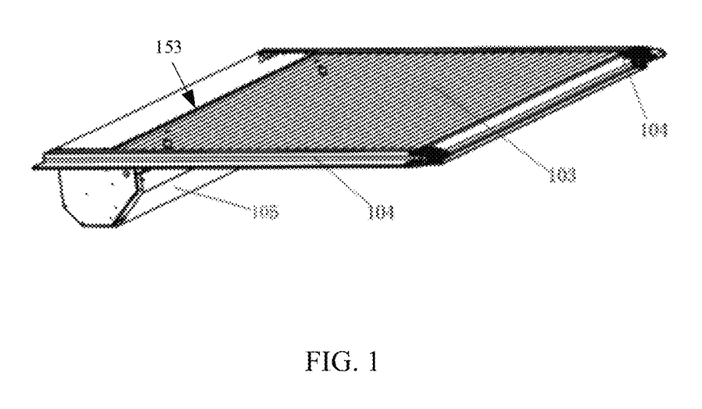
FIG. 1 is a schematic structural diagram of a truck box cover device extended and retracted in a transmission manner in an embodiment of the present invention.
Figure 2:
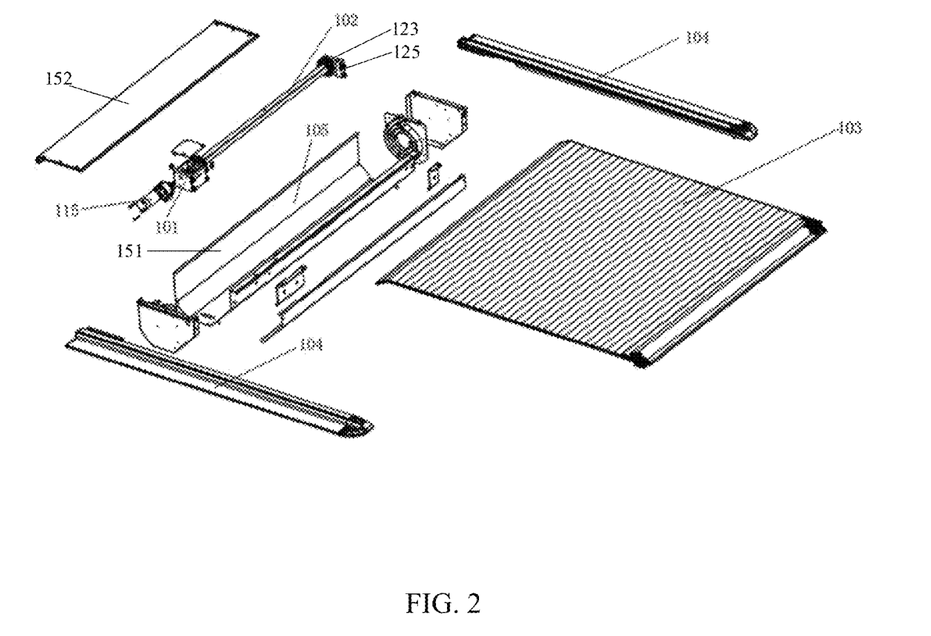
FIG. 2 is an exploded view of a truck box cover device extended and retracted in a transmission manner in an embodiment of the present invention.
Figure 3:
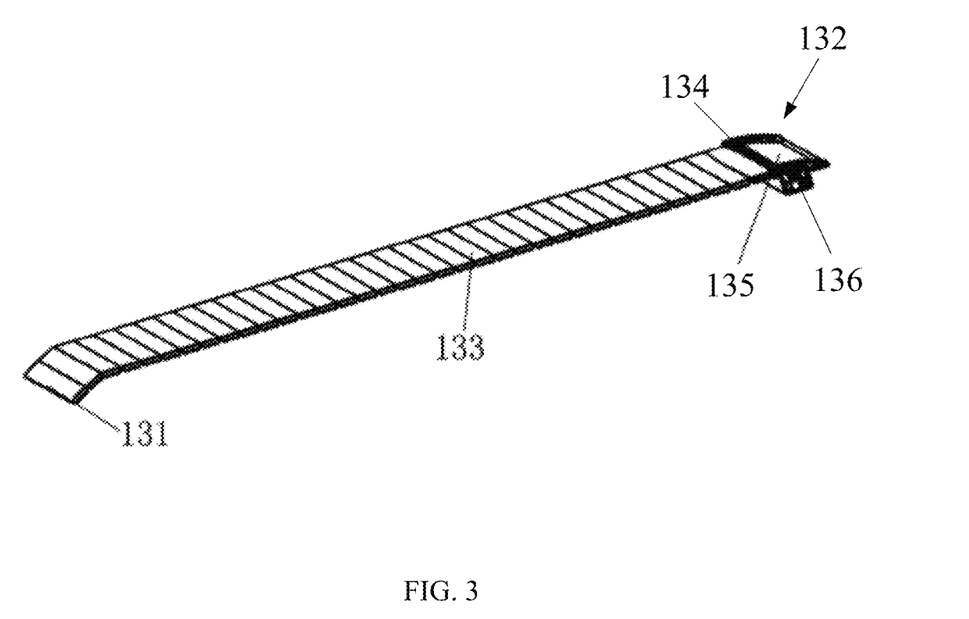
FIG. 3 is a schematic structural diagram of a roller shutter cover in a truck box cover device extended and retracted in a transmission manner in an embodiment of the present invention.
Figure 4:
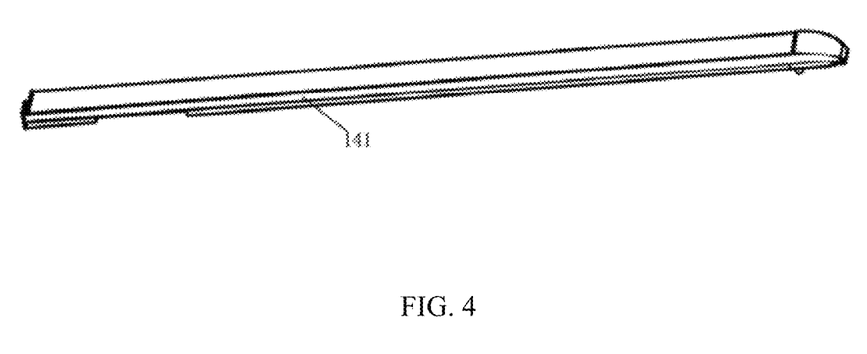
FIG. 4 is a schematic structural diagram of a roller shutter cover rail support frame in a truck box cover device extended and retracted in a transmission manner in an embodiment of the present invention.
Figure 5:
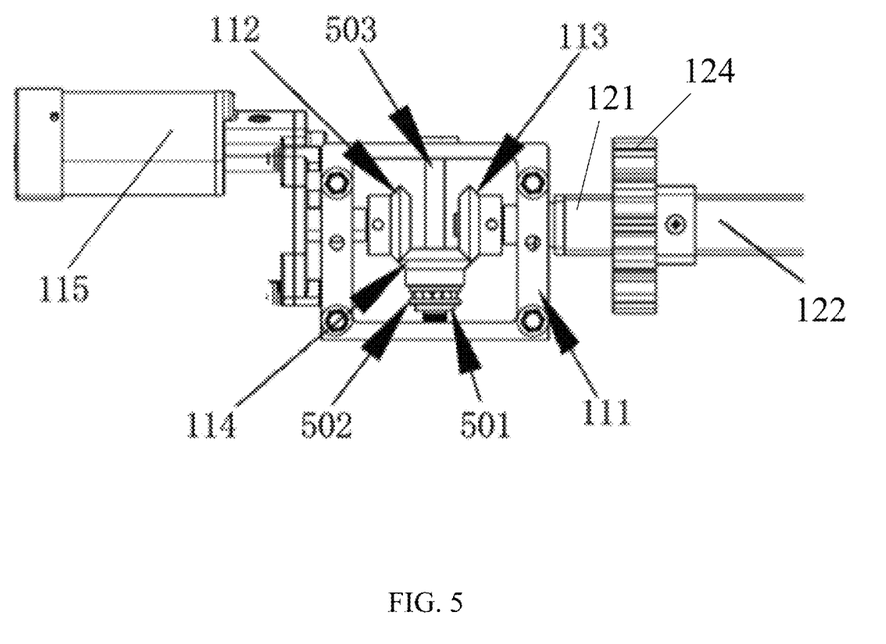
FIG. 5 is a schematic structural diagram of a clutch type driving gearbox in a truck box cover device extended and retracted in a transmission manner in an embodiment of the present invention.
Figure 6:
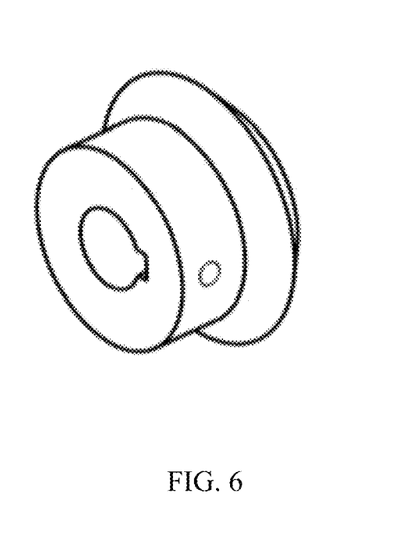
FIG. 6 is a schematic structural diagram of a gear in a truck box cover device extended and retracted in a transmission manner in an embodiment of the present invention.
Figure 7:
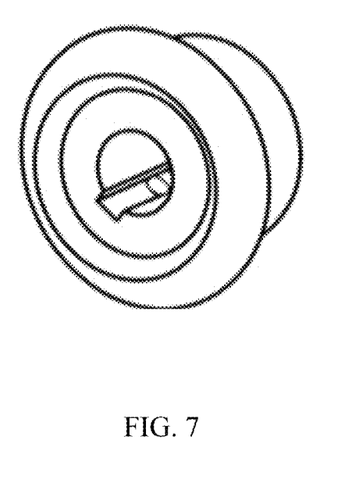
FIG. 7 is a schematic structural diagram showing the other side of the gear in the truck box cover device extended and retracted in a transmission manner in FIG. 6.

The present invention provides a truck box cover device extended and retracted in a transmission manner. The truck box cover device extended and retracted in a transmission manner can electrically control a box cover extended and retracted in a transmission manner on a truck box after it is connected with a controller and is communicated with a power supply of a truck. Additionally, gears and a clutch can be manually separated through external screwing, so the box cover can be manually controlled. Specifically, as shown in FIG. 1 to FIG. 7, FIG. 1 is a schematic structural diagram of a truck box cover device extended and retracted in a transmission manner in an embodiment. FIG. 2 is an exploded view of a truck box cover device extended and retracted in a transmission manner in an embodiment. FIG. 3 is a schematic structural diagram of a roller shutter cover in a truck box cover device extended and retracted in a transmission manner in an embodiment. FIG. 4 is a schematic structural diagram of a roller shutter cover rail support frame in a truck box cover device extended and retracted in a transmission manner in an embodiment. FIG. 5 is a schematic structural diagram of a clutch type driving gearbox in a truck box cover device extended and retracted in a transmission manner in an embodiment. FIG. 6 is a schematic structural diagram of a gear in a truck box cover device extended and retracted in a transmission manner in an embodiment. FIG. 7 is a schematic structural diagram showing the other side of the gear in the truck box cover device extended and retracted in a transmission manner in FIG. 6. The truck box cover device extended and retracted in a transmission manner comprises a clutch type driving gearbox 101, a roller shutter shaft 102, a roller shutter cover 103 and roller shutter cover rail support frames 104.

Specifically, the clutch type driving gearbox 101 is connected with the roller shutter shaft 102 to drive the roller shutter shaft to rotate in a forward/reverse manner or stop rotating. The roller shutter shaft 102 is stripped winding shaft and comprises a transmission end 121 and a roller shutter cover mounting shaft 122. One end of the transmission end is connected with the clutch type driving gearbox and is driven by the clutch type driving gearbox to correspondingly rotate, and the other end is connected to the roller shutter cover mounting shaft. One end, away from the transmission end, of the roller shutter cover mounting shaft is fixed to the interior of a driven bearing 123. The clutch type driving gearbox 101 and the roller shutter shaft 102 are located in a detachable housing 105.

One end 131 of the roller shutter cover 103 is fixed to the roller shutter shaft, and the other end 132 retracts in an extension direction of the roller shutter cover rail support frame. The roller shutter cover rail support frames 104 are vertically and oppositely located on two sides of the roller shutter cover mounting shaft. A rail slot 141 is formed in an inner side wall in a retraction direction of the roller shutter cover. The two rail slots are located in two sides of the roller shutter cover in the retraction direction. Outer sides of the roller shutter cover rail support frames fit for two side walls of an opened top cover in a truck box.

In some optional embodiments, the roller shutter cover is formed by at least two hinged slats 133, or flexible fabrics and the like. Optionally, a step 134 is arranged on an inner side of the retraction end 132 of the roller shutter cover 103. A side wall 151 and a top wall 152 of the housing 105 defines a gap 153 through which the end 131 of the roller shutter cover 103 extends into the housing 105. The height of the step is larger than a height of the gap 153 of the housing 105 for accommodating the roller shutter shaft. An outer side of the retraction end 132 is an arc step 135. An extending guide platform 136 extends from the bottom of the arc step to the outside.

In some optional embodiments, roller shutter cover baffles 124 and 125 are arranged on two sides of the roller shutter cover on the roller shutter shaft such that the roller shutter cover smoothly and stably slides. Optionally, toothed reels are arranged on the two sides of the roller shutter cover on the roller shutter shaft and rotate while matching with toothed guide wheels of the housing.

In some optional embodiments, the clutch type driving gearbox 101 comprises a gearbox case 111, a driving wheel 112, a transmission gear 113 and a clutch gear 114. The driving gear 112, the transmission gear 113 and the clutch gear 114 are located in the gearbox case 111. The driving gear 112 is connected with a driving motor 115 and follows the driving motor to rotate in a forward/reverse manner or stop. The clutch gear 114 transfers an operation state of the driving gear 112 to the transmission gear 113. The transmission gear 113 is connected with the roller shutter shaft and drives the roller shutter shaft to run so as to drive the roller shutter cover mounted on the roller shutter shaft to extend, retract or stop.

The driving gear and the transmission gear are oppositely arranged and forms a clutch gear set with the clutch gear. The clutch gear is located at a position vertical to a center line of a space between the driving gear and the transmission gear. The clutch gear sleeves and is fixed to the middle shaft. The middle shaft is located on the center line of the space between the driving gear and the transmission gear. One end of the middle shaft is inserted in a middle shaft mounting hole of a case of the clutch gear set, and the other end penetrates through a middle shaft regulating hole on the opposite side of the middle shaft mounting hole of the case. The middle shaft is connected with the case through a thread on the side of the middle shaft regulating hole. The middle shaft may move close to or away from the driving gear and the transmission gear by screwing and regulating the middle shaft from the outer side of the middle shaft regulating hole.

Optionally, side panels surround to form a gear accommodation cavity in the gearbox case. A gearbox top cover is fixed to the top of the gear accommodation cavity with the cooperation of bolts and nuts.

In some optional embodiments, the driving gear, the transmission gear and the clutch gear are sector gears, and their sector gear surfaces are opposite. The gears are engaged with each other when the clutch gear is close to the driving gear and the transmission gear; the gears are not engaged with each other when the clutch gear is away from the driving gear and the transmission gear.

In some optional embodiments, a locating stop sheet 501 is arranged between the clutch gear and the case on the middle shaft. The diameter of the locating stop sheet is larger than that of the middle shaft regulating hole. A plane thrust bearing 502 is arranged between the locating stop sheet 501 and the clutch gear 114.

Optionally, roller shutter cover baffles are arranged on two sides of the roller shutter cover on the roller shutter shaft such that the roller shutter cover smoothly and stably slides. Optionally, toothed reels are arranged on the two sides of the roller shutter cover on the roller shutter shaft and rotate while matching with toothed guide wheels of the housing. The toothed reels and the roller shutter cover baffles may be used integrally.

The clutch gear sleeves and is fixed to the middle shaft 503. The middle shaft is located on the center line of the space between the driving gear and the transmission gear. One end of the middle shaft is inserted in a middle shaft mounting hole of a case of the clutch gear set, and the other end penetrates through a middle shaft regulating hole on the opposite side of the middle shaft mounting hole of the case. The middle shaft is connected with the case through a thread on the side of the middle shaft regulating hole. The middle shaft may move close to or away from the driving gear and the transmission gear by screwing and regulating the middle shaft from the outer side of the middle shaft regulating hole. Optionally, the clutch gear sleeves and is fixed to the middle shaft through a bearing. The clutch gear rotates around the bearing.

Optionally, the driving motor may be connected with the controller. The controller can control in a wire or wireless manner to drive the electric roller shutter to run. The wireless control manner specifically is as follows: the electric roller shutter is merely controlled by a "433M remote-control key". Using this control manner, if the remote-control key is damaged, lost or out of power, the electric roller shutter cannot be used. Furthermore, frequency band 433M belongs to the public frequency band, and many civil devices (such as motorbike key, automobile key, electric roller shutter and the like) use it; so, signals in such frequency band are easy to be influenced to be unstable. In the embodiment, besides the existing control manner, there are three other control manners to control the box cover extended and retracted in a transmission manner on the truck box.

The first control manner is: especially for a vehicle box, building a control unit in an original vehicle remote-control key. When using the vehicle, the user must carry the vehicle key. Therefore, in such control manner, the convenience of the electric roller shutter is greatly improved, and the user can control the electric roller shutter without the need of carrying any extra devices.

The second control manner is: using Wechat Mini Program to control Nowadays, the smart phone and the social application are very popular. A mini program for controlling the electric roller shutter can be developed based on the social application platform. Specifically, a processing unit and a Bluetooth module are configured in a transmission controller; identity information of the user is verified based on data interaction between the mini program and the background; then the mini program is communicated with the Bluetooth module of the box cover device extended and retracted in a transmission manner to receive a control signal to remotely control the box cover. In this case, as long as carrying the smart phone, the user can control the roller shutter. Furthermore, data about use situations of the user and states of the device can be stored and analyzed in a big data analysis manner. Therefore, the user experience and the use safety are improved. The Bluetooth module is built in the controller of the electric roller shutter. Therefore, using the mini program of the smart phone, the user can control all functions and states of the electric roller shutter.

The third control manner is: mounting a control button additionally, which is connected to the transmission controller through communication lines. In such manner, the user can freely open and close the electric roller shutter without leaving the cab.

The transmission clutch device by changing relative spaces between the middle shaft gear and the motor shaft gear as well as the roller shutter shaft gear so as to achieve disconnect or connect engagement transmission between the motor shaft gear and the roller shutter shaft gear. It has the advantages of simple structure, quick operation, high operating efficiency, avoidance of professional persons and special tools, easy popularization and utilization, and the like.

Persons skilled in the art may clearly understand that, for the purpose of convenient and brief description, only the division of the foregoing functional units or modules is used as an example for description, and in an actual application, the foregoing functions may be accomplished by different functional units or modules as required, that is, the internal structure of the apparatus is divided into different functional units or modules, so as to accomplish all or a part of the functions in the foregoing description.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to parts of the technical features thereof, and these modifications and replacements do not make the essence of the corresponding technical solution depart from the spirit and scope of the technical solutions of the embodiments of the present invention and should be contained in the protection scope of the present invention.

What is claimed is:

1. A truck box cover device extended and retracted in a transmission manner, comprising a clutch type driving gearbox, a roller shutter shaft, a roller shutter cover and roller shutter cover rail support frames, wherein the clutch type driving gearbox is connected with the roller shutter shaft to drive the roller shutter shaft to rotate in a forward/reverse manner or stop rotating;

the roller shutter shaft comprises a transmission end and a roller shutter cover mounting shaft; one end of the transmission end is connected with the clutch type driving gearbox and is driven by the clutch type driving gearbox to correspondingly rotate, and the other end is connected to the roller shutter cover mounting shaft, one end, away from the transmission end, of the roller shutter cover mounting shaft is fixed to the interior of a driven bearing;

one end of the roller shutter cover is fixed to the roller shutter shaft, and the other end retracts in an extension direction of the roller shutter cover rail support frame;

the roller shutter cover rail support frames are vertically and oppositely located on two sides of the roller shutter cover mounting shaft; a rail slot is formed in an inner side wall in a retraction direction of the roller shutter cover; the two rail slots are located in two sides of the roller shutter cover in the retraction direction; outer sides of the roller shutter cover rail support frames fit for two side walls of an opened top cover in a truck box;

wherein the clutch type driving gearbox comprises a gearbox case, a driving wheel, a transmission gear and a clutch gear; wherein the driving gear, the transmission gear and the clutch gear are located in the gearbox case; the driving gear and the transmission gear are oppositely arranged and forms a clutch gear set with the clutch gear; the clutch gear is located at a position vertical to a center line of a space between the driving gear and the transmission gear.

2. The truck box cover device extended and retracted in a transmission manner according to claim 1, wherein the roller shutter cover is formed by at least two hinged slats.

3. The truck box cover device extended and retracted in a transmission manner according to claim 2, wherein a step is arranged on an inner side of the retraction end of the roller shutter cover, and a height of the step is larger than a height of a gap of a housing for accommodating the roller shutter shaft.

4. The truck box cover device extended and retracted in a transmission manner according to claim 3, wherein an outer side of the retraction end is an arc step; an extending guide platform extends from the bottom of the arc step to the outside.

5. The truck box cover device extended and retracted in a transmission manner according to claim 1, wherein roller shutter cover baffles are arranged on two sides of the roller shutter cover on the roller shutter shaft such that the roller shutter cover smoothly and stably slides.

6. The truck box cover device extended and retracted in a transmission manner according to claim 1, wherein the clutch gear sleeves and is fixed to the middle shaft; the middle shaft is located on the center line of the space between the driving gear and the transmission gear; one end of the middle shaft is inserted in a middle shaft mounting hole of a case of the clutch gear set, and the other end penetrates through a middle shaft regulating hole on the opposite side of the middle shaft mounting hole of the case; the middle shaft is connected with the case through a thread on the side of the middle shaft regulating hole; the middle shaft may move close to or away from the driving gear and the transmission gear by screwing and regulating the middle shaft from the outer side of the middle shaft regulating hole.

7. The truck box cover device extended and retracted in a transmission manner according to claim 1, wherein side panels surround to form a gear accommodation cavity in the gearbox case; a gearbox top cover is fixed to the top of the gear accommodation cavity with the cooperation of bolts and nuts.

8. The truck box cover device extended and retracted in a transmission manner according to claim 1, wherein the driving gear, the transmission gear and the clutch gear are sector gears, and their sector gear surfaces are opposite; the gears are engaged with each other when the clutch gear is close to the driving gear and the transmission gear; the gears are not engaged with each other when the clutch gear is away from the driving gear and the transmission gear.

9. The truck box cover device extended and retracted in a transmission manner according to claim 1, wherein a locating stop sheet is arranged between the clutch gear and the case on the middle shaft, and the diameter of the locating stop sheet is larger than that of the middle shaft regulating hole.

* * * * *